United States Patent
Fukatani et al.

(10) Patent No.: US 6,924,334 B1
(45) Date of Patent: Aug. 2, 2005

(54) POLYOLEFIN RESIN COMPOSITION

(75) Inventors: Juichi Fukatani, Osaka (JP); Koichi Shibayama, Osaka (JP); Koji Taniguchi, Osaka (JP); Hideyuki Takahashi, Osaka (JP); Akihiko Bando, Osaka (JP); Koichiro Iwasa, Kyoto (JP); Naoki Ueda, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 211 days.

(21) Appl. No.: 10/129,988

(22) PCT Filed: Nov. 10, 2000

(86) PCT No.: PCT/JP00/07919

§ 371 (c)(1),
(2), (4) Date: Jul. 8, 2002

(87) PCT Pub. No.: WO01/36532

PCT Pub. Date: May 25, 2001

(30) Foreign Application Priority Data

| | | | |
|---|---|---|---|
| Nov. 12, 1999 | (JP) | ............................................ | 11/322798 |
| Dec. 1, 1999 | (JP) | ............................................ | 11/342168 |
| Dec. 27, 1999 | (JP) | ............................................ | 11/371226 |
| Jan. 24, 2000 | (JP) | ...................................... | 2000-014747 |
| Feb. 7, 2000 | (JP) | ...................................... | 2000/029112 |
| Apr. 6, 2000 | (JP) | ...................................... | 2000/105170 |
| May 19, 2000 | (JP) | ...................................... | 2000/148080 |
| Jun. 20, 2000 | (JP) | ...................................... | 2000/184625 |
| Jun. 27, 2000 | (JP) | ...................................... | 2000/193007 |
| Jun. 28, 2000 | (JP) | ...................................... | 2000/194539 |
| Aug. 22, 2000 | (JP) | ...................................... | 2000/251256 |
| Sep. 26, 2000 | (JP) | ...................................... | 2000/292205 |

(51) Int. Cl.$^7$ ............................................... C08K 3/34
(52) U.S. Cl. ..................... 524/445; 501/145; 501/147; 524/186; 524/436; 524/437; 524/447; 524/449
(58) Field of Search ................................ 524/186, 445, 524/447, 449, 436, 437; 501/145, 147

(56) References Cited

U.S. PATENT DOCUMENTS 5,747,560 A * 5/1998 Christiani et al. .......... 523/209

FOREIGN PATENT DOCUMENTS

| EP | 0 771 854 A2 | | 5/1997 |
|---|---|---|---|
| EP | 771854 A2 | | 5/1997 |
| EP | 0 807 659 | * | 5/1997 |
| EP | 0 995 591 A1 | | 4/2000 |
| JP | 7-53787 A | | 2/1995 |
| JP | 07-053787 | * | 2/1995 |
| JP | 10-182141 A | | 7/1998 |
| JP | 11-071465 A | | 3/1999 |
| JP | 11-228748 A | | 8/1999 |
| JP | 11-228748 | * | 8/1999 |

* cited by examiner

*Primary Examiner*—Edward J. Cain
(74) *Attorney, Agent, or Firm*—Sughrue Mion, PLLC

(57) ABSTRACT

It is an object of the present invention to provide a polyolefin resin composition excellent in flame retardancy, in particular capable of manifesting excellent flame retardancy owing to a shape retaining effect upon combustion, and excellent also in mechanical strength and thermal characteristics, a thermoplastic resin for cable jacketing or sheathing which comprises the above resin composition, and an insulated cable.

The present invention relates to a polyolefin resin composition comprising
100 parts by weight of a polyolefin resin and 0.1 to 100 parts by weight of a layered silicate,
wherein a combustion residue thereof obtained by combusting said polyolefin resin composition by heating for 30 minutes under heating condition of 50 kW/m$^2$ shows a yield point stress of not less than $4.9 \times 10^3$ Pa when compressed at a rate of 0.1 cm/s.

19 Claims, No Drawings

POLYOLEFIN RESIN COMPOSITION

TECHNICAL FIELD

The present invention relates to a polyolefin resin composition having good flame retardancy, a thermoplastic resin for cable jacketing or sheathing which comprises said resin composition, and to an insulated cable.

BACKGROUND ART

Polyolefin resins have recently attracted attention as ecofriendly materials in view of the problems of waste plastics disposal and environmental hormones. Specifically, polyethylene resins and polypropylene resins are under study as alternative materials to polyvinyl chloride resins.

However, since polyolefin resins are nonpolar materials, it is very difficult for them to perform such functions as printability, adhesiveness and flame retardancy. In particular, polyolefin resins belong to one of those classes of resins which are highest in flammability, it is a problem difficult to be solved to cause them to perform flame retardancy. Currently, in many instances, this problem is coped with by incorporating some or other halogen-containing flame retardant into polyolefin resins.

The halogen-containing flame retardant is highly effective in rendering materials flame-retardant and decreases the moldability and the mechanical strength of moldings only to a relatively small extent. However, when it is used, a large amount of a halogen-based gas may possibly be generated in the step of molding or upon combustion and it is a matter of concern that the gas generated may corrode apparatus or adversely affect human bodies. Accordingly, a treatment method without using any halogen-containing compound, namely a halogen-free treatment method for rendering materials flame-retardant is strongly desired from the safety viewpoint.

As one of the halogen-free technologies for rendering polyolefin resins flame-retardant, a technology which comprises adding a metal compound which will not generate any toxic gas upon combustion, such as aluminum hydroxide, magnesium hydroxide or basic magnesium carbonate, to polyolefin resins is disclosed in Japanese Kokai Publication Sho-57-165437 and Japanese Kokai Publication Sho-61-36343, for instance.

However, for providing polyolefin resins, which are readily combustible, with a satisfactory level of flame retardancy, it is necessary to add the above metal compound in large amounts. As a result, there arises a problem: the moldings obtained markedly decreases in mechanical strength and can hardly be put to practical use.

Among the metal compounds mentioned above, metal hydroxides such as aluminum hydroxide and magnesium hydroxide, when added to polyolefin resins, cannot form coat layers upon combustion but allow exposure of fragile ashes and dropping of residues. As a result, their function as thermal insulation layers are lost at early stages, and the spreading of fire due to deformation of materials cannot be prevented.

Another method of providing polyolefin resins with flame retardancy has also been proposed which comprises adding a phosphorus-based flame retardant thereto to thereby utilize the oxygen barrier effect produced by surface coat formation upon combustion. However, for providing polyolefin resins, which are readily combustible, with a satisfactory level of flame retardancy, it is necessary to add a phosphorus-based flame retardant in large amounts. As a result, there arises a problem: the moldings obtained markedly decreases in mechanical strength and can hardly be put to practical use.

When a phosphorus-based flame retardant is added to polyolefin resins, it may indeed locally form a coat but cannot form any strong coat layer as continuous layer. The coats formed locally are very weak in mechanical strength and, upon combustion, allow exposure of fragile ashes and dropping of residues. As a result, their function as thermal insulation layers are lost at early stages, and the spreading of fire due to deformation of materials cannot be prevented.

Further, Japanese Kokai Publication Hei-06-2470 discloses a resin composition which comprises a polyolefin resin and, as additives, red phosphorus or a phosphorus compound and a swellable graphite species. This resin composition has sufficient flame retardancy when evaluated from the oxygen index viewpoint and can form coat films only locally but cannot form any firm and continuous coat layer. The coats formed locally are very weak in mechanical strength and, upon combustion, allow exposure of fragile ashes and dropping of residues. As a result, their function as thermal insulation layers are lost at early stages, and the spreading of fire due to deformation of materials cannot be prevented.

Therefore, when used as wall reinforcements in the form of molded flame-retardant sheet materials, for instance, polyolefin resins cannot satisfy the fire resistance or fire protection test requirement that when one side is heated to 1,000° C. the reverse side temperature shall not be not higher than 260° C. Thus, not only the fire resistance is not satisfactory but also there arises a problem: fragile ashes alone remain and residues drop in the fire resistance or protection test, so that their function as thermal insulation layers are lost at early stages.

SUMMARY OF THE INVENTION

In view of the foregoing, it is an object of the present invention to provide a polyolefin resin composition excellent in flame retardancy, in particular capable of manifesting excellent flame retardancy owing to a shape retaining effect upon combustion, and excellent also in mechanical strength and thermal characteristics, a thermoplastic resin for cable jacketing or sheathing which comprises the above resin composition, and an insulated cable.

The present invention provides a polyolefin resin composition comprising
100 parts by weight of a polyolefin resin and 0.1 to 100 parts by weight of a layered silicate,
wherein a combustion residue thereof obtained by combusting said polyolefin resin composition by heating for 30 minutes under heating condition of 50 kW/m² shows a yield point stress of not less than $4.9 \times 10^3$ Pa when compressed at a rate of 0.1 cm/s.

The polyolefin resin composition of the present invention preferably shows a maximum heat release rate of not more than 800 kW/m², upon combustion by heating for 30 minutes under heating condition of 50 kW/m².

Preferably, the above polyolefin resin is at least one resin selected from the group consisting of ethylene homopolymers, propylene homopolymers, copolymers of ethylene or propylene and an α-olefin copolymerizable therewith, copolymers of ethylene and (meth)acrylate and copolymers of ethylene and vinyl acetate.

The above layered silicate is preferably montmorillonite and/or a swellable mica species.

Preferably, the above layered silicate comprises metal ions as exchangeable cations in the crystal structure thereof.

Preferably, some or the whole of the metal ions have been exchanged for a cationic surfactant.

The cationic surfactant is preferably a homopolymer of a (meth)acrylic monomer having a quaternary ammonium salt structure, or a copolymer of a (meth)acrylic monomer having a quaternary ammonium salt structure and another (meth)acrylic monomer and/or a styrenic monomer, or a quaternary alkylphosphonium salt having an alkyl group containing not less than 6 carbon atoms.

The above layered silicate preferably has a mean interlayer distance of not less than 3 nm as determined for the (001) face thereof by wide-angle X ray diffractometry and comprises pieces dispersing in an at most 5-layerd condition in the polyolefin resin composition. The mean interlayer distance is more preferably not less than 6 nm.

Preferably, the above polyolefin resin composition further comprises 0.5 to 100 parts by weight of at least one compound selected from the group consisting of phosphorus compounds, metal hydroxides and melamine derivatives.

The above phosphorus compound is preferably at least one phosphorus compound selected from the group consisting of red phosphorus, ammonium polyphosphate and phosphorus compounds represented by the following general formula (1):

$$R^3(R^2)(OR^1)P=O \qquad (1)$$

in the formula $R^1$ and $R^3$ each represents a hydrogen atom, an alkyl group containing 1 to 16 carbon atoms or an aryl group and $R^2$ represents a hydrogen atom, a hydroxyl group, an alkyl or alkoxy group containing 1 to 16 carbon atoms, or an aryl or aryloxy group and wherein $R^1$, $R^2$ and $R^3$ may be the same or different from one another.

Preferably, the polyolefin resin composition of the present invention further comprises 0.5 to 20 parts by weight of a silicate compound other than the layered silicate.

Preferably, the polyolefin resin composition further comprises 0.1 to 10 parts by weight of a metal oxide.

Preferably, the polyolefin resin composition further contains an AB type block copolymer comprising a segment (A) having functional groups showing reactivity with the polyolefin resin and a segment (B) having affinity for the polyolefin resin.

Preferably, the polyolefin resin composition further comprises 0.01 to 30 parts by weight of an aromatic hydroxyl-containing compound.

A thermoplastic resin intended for use in cable jacketing or sheathing which comprises the polyolefin resin composition also constitutes another aspect of the present invention.

An insulated cable which comprises the above thermoplastic resin also constitutes a further aspect of the present invention.

DETAILED DESCRIPTION OF THE INVENTION

In the following, the present invention is described in detail.

The polyolefin resin composition of the invention comprises 100 parts by weight of a polyolefin resin and 0.1 to 100 parts by weight of a layered silicate.

The polyolefin resin to be used in the practice of the invention is one derived from an olefinic monomer having a polymerizable double bond by polymerization.

The olefinic monomer mentioned above is not particularly restricted but includes, for example, α-olefins such as ethylene, propylene, 1-butene, 1-pentene, 1-hexene, 1-heptene, 1-octene and 4-methyl-1-pentene, and conjugated dienes such as butadiene and isoprene. These olefinic monomers may be used singly or two or more of them may be used in combination.

The above polyolefin resin is not particularly restricted but includes, for example, ethylene homopolymers, copolymers of ethylene and α-olefin, copolymers of ethylene and (meth)acrylic acid, copolymers of ethylene and(meth) acrylate, copolymers of ethylene and vinyl acetate, propylene-homopolymers, copolymers of propylene and α-olefin, random copolymers or block copolymers of propylene and ethylene, butene homopolymers, and homopolymers or copolymers of a conjugated diene such as butadiene or isoprene. These polyolefin resins may be used singly or two or more of them may be used in combination. In the present description, "(meth)acrylic or (meth)acrylate" means "acrylic or acrylate" or "methacrylic or methacrylate".

Among the above polyolefin resins, ethylene homopolymers, propylene homopolymers, copolymers of ethylene or propylene and an α-olefin copolymerizable therewith, copolymers of ethylene and (meth)acrylate and copolymers of ethylene and vinyl acetate are suitably used. These polyolefin resins may be used singly or in combination of two or more.

The molecular weight and molecular weight distribution of the above polyolefin resin are not particularly restricted. Preferably, however, the weight average molecular weight thereof is 5,000 to 5,000,000, more preferably 20,000 to 300,000, and the molecular weight distribution (weight average molecular weight/number average molecular weight) is preferably 1.1 to 80, more preferably 1.5 to 40.

The layered silicate to be used in the practice of the invention is a silicate mineral having exchangeable cations within the crystal structure thereof, inclusive of interlayer spaces.

The above layered silicate is not particularly restricted but includes, for example smectite clay mineral such as montmorillonite, saponite, hectorite, baidellite, stevensite, and nontronite, vermiculite, halloysite, and swellable mica species. Among them, montmorillonite and swellable mica species are suitably used. These layered silicates may be used singly or in combination of two or more.

The above layered silicates may be natural products or synthetic ones.

Preferred as the above layered silicates are smectite clay minerals and swellable mica species, which are high in the shape anisotropy effect defined by the formula (1) shown below, from the viewpoint of improvements in mechanical strength and gas barrier properties of the polyolefin resin composition and moldings thereof.

Shape anisotropy effect=Area of crystal face (*a*)/area of crystal face (*b*)     (1)

The cation exchange capacity of the above layered silicate is not particularly restricted but is preferably 50 to 200 milliequivalents/100 g. When it is less than 50 milliequivalents/100 g, the amount of the cationic surfactant intercalated between crystal layers as a result of ion exchange becomes small, hence the interlayer spaces may be rendered nonpolar only to an insufficient extent. When, on the other hand, it exceeds 200 milliequivalents/100 g, the interlayer bonding strength of the layered silicate becomes strong, whereby it may become difficult in some instances for crystal lamellae to be delaminated.

The above exchangeable cations are not particularly restricted but includes, among others, monovalent metal ions such as sodium or potassium ions.

In exchanging other metal ions for the exchangeable cations, those metal ions are preferably used for the exchange which, through ion exchange, show an improving effect on the acidity of the layered silicate as compared with that before ion exchange. When the acidity of the layered silicate is improved, the reactivity thereof with the polyolefin resin and/or the additive(s) added to the polyolefin resin tends to be improved, leading to an improvement in the dispersibility of the layered silicate.

The layered silicate to be used in the practice of the present invention is preferably one resulting from ion exchange of divalent metal ions for the exchangeable cations in the crystal structure thereof. Ion exchange with metal ions higher in valency than divalent ions results in strengthening of the interlayer bonding strength of the layered silicate and, as a result, delamination may not proceed in some cases.

The above divalent metal ions are not particularly restricted but includes, for example, nickel, magnesium, and calcium ions. The improving effect of ion exchange with these metal ions on the acidity of the layered silicate grows in the order of nickel, magnesium and calcium.

The fact that the acidity of hydroxyl groups of crystal lamellae of the layered silicate is improved by ion exchange with divalent metal ions such as nickel, magnesium, or calcium ions has been reported by Nishihama et al. "Clay Materials" (1997, 32, pp. 645–651), for instance. Among the divalent metal ions mentioned above, nickel ions and magnesium ions are preferred since these ions improve the crystal lamella-to-lamella bonding strength upon sintering and facilitate the formation of firm and strong sintered coats.

The layered silicate to be used in the practice of the present invention preferably contains a cationic surfactant within the crystal structure thereof. As a method of causing the layered silicate to contain a cationic surfactant within the crystal structure thereof, there may be mentioned, for example, the method which comprises exchanging a cationic surfactant for part or all of the metal cations occurring as exchangeable cations in the crystal structure of the layered silicate.

The above cationic surfactant is not particularly restricted but may be a quaternary ammonium salt or a quaternary phosphonium salt.

The above quaternary ammonium salt is not particularly restricted but includes, among others, (co)polymers having a quaternary ammonium salt structure such as a lauryltrimethylammonium salt, stearyltrimethylammonium salt, trioctylammonium salt, distearyldimethylammonium salt, di-hardened beef tallow-dimethylammonium salt or distearyldibenzylammonium salt. These quaternary ammonium salts may be used singly or in combination of two or more. In the present description, the term "(co)polymer" includes polymers or copolymers.

The above (co)polymers having a quaternary ammonium salt structure are not particularly restricted but include, for example, (co)polymers obtained by converting to a quaternary ammonium salt from homopolymers of a (meth)acrylic monomer having an amino, alkylamino, dialkylamino or like group or copolymers of such a (meth)acrylic monomer with another (meth)acrylic monomer and/or a styrenic monomer such as styrene, α-methylstyrene or vinyltoluene using hydrochloric acid or the like. These (co)polymers having a quaternary ammonium salt structure may be used singly or in combination of two or more.

When the above cationic surfactant used is a (co)polymer having a high oxygen content or a (co)polymer having an aromatic ring such as a styrene ring, the organic incombustible coat formation is promoted and, as a result, the flame retardancy is improved. Further, exchange of a long-chain (co)polymer for the metal ions contained as exchangeable cations between lamellae of the layered silicate makes it easy for the layered silicate to be delaminated and dispersed, so that uniform inorganic sintered coats are formed upon combustion and the flame retardancy is thus improved.

The above-mentioned quaternary phosphonium salt is not particularly restricted but includes, for example, dodecyltriphenylphosphonium salts (DTPB), methyltriphenylphosphonium salts, lauryltrimethylphosphonium salts, stearyltrimethylphosphonium salts, trioctylphosphonium salts, distearyldimethylphosphonium salts, and distearylbenzylphosphonium salts. These quaternary phosphonium salts may be used singly or in combination of two or more.

When such a quaternary phosphonium salt is used as the above cationic surfactant, the intercalant is readily fixed between layers of the layered silicate upon combustion and the flame retardancy improving effect is thereby increased. This is because the quaternary phosphonium salt is higher in itself in flame retardancy as compared with quaternary ammonium salts and other intercalants.

Further, since the quaternary phosphonium salt contains phosphorus, it forms surface coats upon combustion and produces an oxygen barrier effect, in the same manner of functioning as the phosphorus compound mentioned later herein. In this case, as compared with the case where a phosphorus compound alone is added as a flame retardant to the polyolefin resin, the phosphorus component occurs in the vicinity of crystal lamellae of the layered silicate and, therefore, the crystal lamellae and the phosphorus component interact with each other and more effective coat formation is realized.

Among the above-mentioned quaternary phosphonium salts, quaternary alkylphosphonium salts having an alkyl group containing not less than 6 carbon atoms are preferably used. When the number of carbon atoms in the alkyl group is less than 6, the hydrophilicity of the alkylphosphonium ion increases and it may become no longer possible to render interlayer spaces of the layered silicate nonpolar to a sufficient extent.

The layered silicate to be used in the practice of the invention preferably has a mean interlayer distance of not shorter than 3 nm as determined for the (001) face by wide-angle X ray diffractometry and preferably comprises pieces dispersing in an at most 5-layered condition in the polyolefin resin composition.

The number of layers of the layered silicate and the proportion thereof can be calculated by transmission electron microscopy.

The mean interlayer distance of the layered silicate is the mean interlayer distance with each thin lamellar crystal being regarded as a layer and can be calculated from X ray diffraction peaks and by transmission electron microscopy, namely by wide-angle X ray diffractometry.

When the above mean interlayer distance is not shorter than 3 nm, it becomes easy for the polyolefin resin to enter interlayer spaces of the layered silicate, so that the layered silicate is separated into pieces composed of at most 5-layered crystal lamellae, whereupon the interface area increases. Interlayer cleavage of not shorter than 3 nm means that the layered silicate is in a condition readily dispersible upon combustion or the like and, further, the condition dispersed in an at most 5-layered state means that the interlayer interaction is weak, hence laminated bodies of the layered silicate are partly in a dispersed state. Therefore, when the above layered silicate has a mean interlayer distance of not shorter than 3 nm and comprises pieces dispersing in an at most 5-layered condition in the polyolefin resin composition, the polyolefin resin composition of the present invention can readily manifest such functions as flame retardancy, mechanic strength and gas barrier properties.

The above mean interlayer distance is preferably not shorter than 6 nm. When the mean interlayer distance is not shorter than 6 nm, the crystal lamellae layer of the layered silicate are separated into the respective layer and, as a result, the interaction between crystal lamellae layer of the layered silicate becomes weakened almost to a negligible level, so that the condition of the layered silicate-constituting crystal lamellae separated to layers in the polyolefin resin shifts toward stabilization by delamination/disintegration.

Delamination of the layered silicate forming a number of layers in its crystal condition results in an increase in the number of crystal lamellae and in the interface area of the layered silicate and, at the same time, in a reduction in the distance between crystal lamellae. Thus, it is presumable that the formation of sintered bodies is facilitated as a result of migration of those crystal lamellae of the layered silicate upon combustion.

The layered silicate to be used in the practice of the invention is preferably such that at least 10% by weight, more preferably at least 20% by weight, of the layered silicate salt can be dispersed in an at most 5-layered condition. When the silicate is delaminated to at most 5-layered condition, the effects as mentioned above can be obtained. A condition delaminated to at most 3-layered state is more effective, hence is preferred. In a still more effective condition of delamination, the silicate is in a condition delaminated to respective single-layer lamellae.

Thus, when the above layered silicate has a mean interlayer distance of not shorter than 3 nm and comprises pieces dispersing in an at most 5-layered condition in the polyolefin resin composition, the polyolefin resin composition of the present invention can readily form sintered bodies capable of serving as flame retardant coats. As the degree of dispersion becomes higher, these sintered bodies are formed at earlier stages of combustion and they can shut out not only the oxygen supply from outside but also the combustible gases generated upon combustion, so that excellent flame retardancy can be manifested.

The layered silicate to be used in the practice of the invention may be treated with a compound having a functional group capable of chemically binding to or showing chemical affinity for end face hydroxyl groups.

The above functional group capable of chemically binding to or showing chemical affinity for the hydroxyl groups is not particularly restricted but includes, for example, alkoxy, epoxy, carboxyl, hydroxyl, maleic anhydride, isocyanato, aldehyde groups and like functional groups having high chemical affinity for hydroxyl groups.

The above compound having such a functional group capable of chemically binding to or showing chemical affinity for the hydroxyl groups is not particularly restricted but includes, among others, those silane compounds, titanate compounds, glycidyl compounds, carboxylic acids and alcohols having at least one of the various functional groups mentioned above. Among them, silane compounds are suitably used. These compounds may be used singly or in combination of two or more.

The above silane compound is not particularly restricted but includes, for example, vinyltrimethoxysilane, vinyltriethoxysilane, vinyltris(β-methoxyethoxy)silane, γ-aminopropyltrimethoxysilane, γ-aminopropylmethyldimethoxysilane, γ-aminopropyldimethylmethoxysilane, γ-aminopropyltriethoxysilane, γ-aminopropylmethyldiethoxysilane, γ-aminopropyldimethylethoxysilane, methyltriethoxysilane, dimethyldimethoxysilane, trimethylmethoxysilane, hexyltrimethoxysilane, hexyltriethoxysilane, N-β(aminoethyl)γ-aminopropyltrimethoxysilane, N-β(aminoethyl)γ-aminopropyltriethoxysilane, N-β(aminoethyl)γ-aminopropylmethyldimethoxysilane, octadecyltrimethoxysilane, octadecyltriethoxysilane, γ-methacryloxypropylmethyldimethoxysilane, γ-methacryloxypropyltrimethoxysilane, γ-methacryloxypropylmethyldiethoxysilane, and γ-methacryloxypropyltriethoxysilane. These silane compounds may be used singly or in combination of two or more of them.

The addition amount of the above layered silicate is 0.1 to 100 parts by weight per 100 parts by weight of the polyolefin resin. When it is less than 0.1 part by weight, a formation of a sintered body becomes difficult and the flame retardancy of the resulting polyolefin resin composition and moldings becomes insufficient. When, on the other hand, it exceeds 100 parts by weight, the specific gravity of the resulting polyolefin resin composition and moldings increases and the practicality thereof is impaired. An addition amount of 5 to 100 parts by weight is preferred.

As for the method of dispersing the layered silicate in the polyolefin resin, mention may be made of (1) the method which comprises using the layered silicate in an organically treated form, and (2) the method of dispersion which causes the resin to foam in the presence of the layered silicate, among others. The methods (1) and (2) may be used singly or in combination. By using these methods of dispersion, it is possible to disperse the layered silicate uniformly and finely in the above polyolefin resin.

As the method (1) which comprises organically treating the layered silicate, there may be mentioned, for example, (1—1) the method comprising exchanging the above-mentioned cationic surfactant for the metal cations occurring as exchangeable cations in the crystal structure of the layered silicate, (1-2) the method comprising modifying hydroxyl groups occurring on the crystal surface of the layered silicate with a compound having, at a molecular terminus, at least one functional group capable of chemically binding to or showing chemical affinity for a hydroxyl group and/or at least one reactive functional group, and (1-3) the method comprising modifying the crystal surface of the layered silicate with a reagent having anionic surfactant activity and/or a reagent having anionic surfactant activity and having at least one reactive functional group at a site other than the anionic site in the molecular chain thereof. These methods may be used singly or two or more may be used in combination.

As the above method (2) of effecting dispersion by foaming in the presence of the layered silicate, there may be mentioned, for example, (2-1) the method which comprises impregnating, under high pressure, a composition comprising 100 parts by weight of the polyolefin resin and 0.1 to 100 parts by weight of the layered silicate with a compound which is gaseous at ordinary temperature and ordinary pressure and, then, vaporizing this gaseous compound within the composition to thereby form a foamed body and effect dispersion, and (2—2) the method which comprises causing a thermal decomposition type foaming agent to be contained between layers of the layered silicate and decomposing, by heating, the thermal decomposition type foaming agent to thereby form a foamed structure and effect dispersion. These methods may be used singly or in combination of two or more.

As the above layered silicate is delaminated between layers and the resulting crystal lamellae are dispersed in the polyolefin resin, the mean distance between crystal lamellae decreases and the formation of sintered bodies by migration of the crystal lamellae of the above layered silicate upon combustion becomes facilitated. Further, with the advancement of the dispersion of crystal lamellae of the layered silicate, the elastic modulus and gas barrier properties of the polyolefin resin-layered silicate composite material are markedly improved.

Each of the above phenomena is caused by the increase in interface area between the layered silicate and the polyolefin resin with the improvement in the degree of dispersion of the crystal lamellae. Namely, the movement of molecules of the polyolefin resin at adhering faces between the polyolefin resin and layered silicate is restrained and the mechanical strength, such as elastic modulus, of the polyolefin resin is improved. Therefore, with the improvement in the degree of dispersion of the crystal lamellae, the mechanical strength of the polyolefin resin can be increased more efficiently.

Further, since, in a polymer, gas molecules can disperse by far more readily as compared with inorganic matters, gas molecules disperse while going around inorganic matters when they disperse within a composite material. Therefore, in the present invention as well, with the improvement in the degree of dispersion of crystal lamellae of the layered silicate, the gas barrier properties of the polyolefin resin can be improved more efficiently.

A combustion residue obtained by combusting the polyolefin resin composition of the present invention by heating for 30 minutes under heating condition of 50 kW/m$^2$, shows a yield point stress of not less than $4.9 \times 10^3$ Pa when compressed at a rate of 0.1 cm/s.

For sintered bodies formed from the polyolefin resin composition to function as flame retardant coats, it is necessary that the sintered bodies retain their shape and form until the end of combustion. If, when the combustion residue of the polyolefin resin composition is compressed and no yield point is found, a slight force may already disintegrate the combustion residue. Even if there is a yield point, when the yield point stress is less than $4.9 \times 10^3$ Pa, the combustion residue will also be disintegrated by a slight force. A yield point stress of not less than $1.5 \times 10^4$ Pa is preferred.

The polyolefin resin composition of the present invention shows a maximum heat release rate of not more than 800 kW/m$^2$, upon combustion by heating under heating condition of 50 kW/m$^2$ for 30 minutes, preferably. When the rate is above 800 kW/m$^2$, the flames are too strong upon combustion and the combustion over the polyolefin resin composition can hardly be prevented. More preferably, the rate is not more than 400 kW/m$^2$.

For attaining further improved flame retardancy, the polyolefin resin composition of the present invention preferably comprises a phosphorus compound, a metal hydroxide and/or a melamine derivative. The phosphorus compound, metal hydroxide and/or melamine derivative may be used singly or in combination of two or more species.

The above phosphorus compound is not particularly restricted but includes, for example, red phosphorus, ammonium polyphosphate, and phosphorus compounds represented by the general formula (1) given below. Among them, phosphorus compounds represented by the general formula (1) are suitably used. These phosphorus compounds may be used singly or in combination of two or more.

$$R^3(R^2)(OR^1)P=O \qquad (1)$$

in the formula, $R^1$ and $R^3$ each represents a hydrogen atom, an alkyl group containing 1 to 16 carbon atoms or an aryl group and $R^2$ represents a hydrogen atom, a hydroxyl group, an alkyl or alkoxy group containing 1 to 16 carbon atoms, or an aryl or aryloxy group and, $R^1$, $R^2$ and $R^3$ may be the same or different from one another. When the above-mentioned number of carbon atoms exceeds 16, the relative phosphorus content decreases, so that the flame retardancy providing effect may become unsatisfactory.

Preferred as the above-mentioned red phosphorus is a surface-modified one obtainable by coating with a resin for improving the moisture resistance or preventing spontaneous combustion in the step of kneading with a polyolefin resin.

The above-mentioned ammonium polyphosphate may be melamine-modified or otherwise surface-treated.

The above-mentioned phosphorus compound represented by the general formula (1) is not particularly restricted but includes, for example, methylphosphonic acid, dimethyl methylphosphonate, diethyl methylphosphonate, ethylphosphonic acid, propylphosphonic acid, butylphosphonic acid, 2-methylpropylphosphonic acid, tert-butylphosphonic acid, 2,3-dimethylbutylphosphonic acid, octylphosphonic acid, phenylphosphonic acid, dioctyl phenylphosphonate, dimethylphosphinic acid, methylethylphosphinic acid, methylpropylphopshinic acid, diethylphosphinic acid, dioctylphosphinic acid, phenylphosphinic acid, diethylphenylphosphinic acid, diphenylphosphinic acid, and bis(4-methoxyphenyl)phosphinic acid. These phosphorus compounds may be used singly or in combination of two or more of them.

The addition amount of the above phosphorus compound is preferably 0.5 to 100 parts by weight per 100 parts by weight of the polyolefin resin. If it is less than 0.5 part by weight, a satisfactory flame retardancy improving effect may not be achieved. If it exceeds 100 parts by weight, the mechanical strength of the moldings obtained from the polyolefin resin composition may decrease. An addition amount of 2 to 50 parts by weight is more preferred.

The above metal hydroxide is not particularly restricted but includes, for example, magnesium hydroxide, aluminum hydroxide, calcium hydroxide, dawsonite, calcium aluminate, and gypsum dihydrate. Among them, magnesium hydroxide and aluminum hydroxide are suitably used. These metal hydroxides may be used singly or in combination of two or more. When two or more metal hydroxides are used in combination, the respective metal hydroxides begin to undergo decomposition/dehydration reactions at different temperatures, so that a higher flame retardancy providing effect can be produced.

The above metal hydroxide may be surface-treated with a surface treatment agent. The above surface treatment agent is not particularly restricted but includes, for example, silane coupling agents, titanate coupling agents, aluminum coupling agents, polyvinyl alcohol surface treatment agents, epoxy surface treatment agents, and higher fatty acid surface treatment agents. These surface treatment agents may be used singly or in combination of two or more.

The addition amount of the above metal hydroxide is preferably 0.5 to 100 parts by weight per 100 parts by weight of the polyolefin resin. When the amount is less than 0.5 part, the flame retardancy improving effect may not be produced to a satisfactory extent. On the other hand, it exceeds 100 parts by weight, the flame retardancy may increase but the resulting increase in specific gravity and lack of flexibility may cause troubles. An amount of 20 to 60 parts by weight is more preferred.

The metal hydroxide mentioned above reacts in the manner of endothermic dehydration reaction at high temperatures upon combustion and thus absorbs heat and releases water molecules to thereby lower the temperature at the site of combustion and produce a fire-extinguishing effect. Further, since the polyolefin resin composition of the present invention comprises the layered silicate, the flame retardancy improving effect of the metal hydroxide is more increased. This is due to the fact that the flame retardancy improving effect of coat formation by the above layered silicate upon combustion and the flame retardancy improving effect of the endothermic dehydration reaction of the metal hydroxide are produced competitively and the respective effects are thus mutually synergized.

The above-mentioned melamine derivative is not particularly restricted but includes, for example, melamine, melamine cyanurate, melamine isocyanurate, melamine phosphate, and surface treated products derived therefrom. These melamine derivatives may be used singly or in combination of two or more. As the above surface treatment, there may be mentioned the same treatment as the one to be applied to the metal hydroxide.

The addition amount of the above melamine derivative is preferably 0.5 to 100 parts by weight per 100 parts by weight of the polyolefin resin. When it is less than 0.5 part by weight, the flame retardancy improving effect may be unsatisfactory. When, on the other hand, it is above 100 parts by weight, the physical properties of the polyolefin resin composition of the invention may be impaired and/or the layered silicate may be inhibited from forming a sintered coat. An addition amount of 1 to 30 parts by weight is more preferred.

For attaining more improved flame retardancy, the polyolefin resin composition of the invention preferably comprises s silicate compound other than the above-mentioned layered silicates.

The above silicate compound is not particularly restricted but includes, among others, calcium silicates such as wollastonite and xonotlite; clay minerals such as talc, activated clay, kaolin clay, sepiolite, and imogolite; and silica-based balloons. Among them, talc is suitably used since it is superior in affinity for the above layered silicate and in particle size selectivity. These silicate compounds may be used singly or in combination of two or more.

The above silicate compound preferably has a mean particle size differing from that of the layered silicate. When such silicate compound differing in mean particle size from the above-mentioned layered silicate is added to the polyolefin resin composition of the present invention, it becomes easy for the inorganic components of the layered silicate and silicate compound to coat the combustion product surface by forming sintered bodies, so that firm flame retardant coats can readily be formed.

The addition amount of the above silicate compound is preferably 0.5 to 20 parts by weight per 100 parts by weight of the polyolefin resin. When it is less than 0.5 part by weight, the flame retardancy improving effect may be unsatisfactory. When, on the other hand, it is above 20 parts by weight, the mechanical strength of the moldings obtained from the polyolefin resin composition may decrease or the specific gravity may become excessively high. A more preferred addition amount is 2 to 10 parts by weight.

Preferably, the polyolefin resin composition of the invention further contains a metal oxide for attaining still improved the flame retardancy.

The above metal oxide is not particularly restricted but includes, among others, copper(I) oxide, copper (II) oxide, magnesium oxide, calcium oxide, titanium dioxide, zirconium dioxide, chromium(II) oxide, chromium(III) oxide, chromium(VI) oxide, aluminum oxide, antimony(III) oxide, antimony(V) oxide, yttrium(III) oxide, indium(I) oxide, indium(II) oxide, indium(III) oxide, potassium oxide, silver (I) oxide, silver(II) oxide, germanium(II) oxide, germanium (IV) oxide, cobalt(II) oxide, cobalt(III) oxide, tin(II) oxide, tin(IV) oxide, cesium oxide, thallium(I) oxide, thallium(III) oxide, tungsten(IV) oxide, tungsten(VI) oxide, titanium(II) oxide, titanium(III) oxide, titanium(IV) oxide, zinc oxide, iron(II) oxide, iron(III) oxide, barium oxide, manganese(II) oxide, manganese(III) oxide, manganese(IV) oxide, manganese(VII) oxide, molybdenum(IV) oxide, molybdenum(VI) oxide, lithium oxide, ruthenium(IV) oxide, and ruthenium(VIII) oxide. These metal oxides may be used singly or a two or more of them may be used in combination.

The above metal oxide functions as a catalyst promoting the formation of organic incombustible coats on the occasion of combustion of the polyolefin resin composition of the invention and, by causing the formation of firmer organic incombustible coats, it has a function in manifestation of a high level of flame retardancy.

The addition amount of the above metal oxide is preferably 0.1 to 10 parts by weight per 100 parts by weight of the polyolefin resin. When it is less than 0.1 part by weight, the flame retardancy improving effect may be unsatisfactory. On the other hand, when it exceeds 10 parts by weight, the physical properties of the polyolefin resin composition of the invention may decrease. An addition amount of 0.2 to 5 parts by weight is more preferred.

For attaining still improved flame retardancy, it is preferred that the polyolefin resin composition of the invention further contain an AB type block copolymer comprising a segment (A) block having a functional group showing reactivity with the polyolefin resin and a segment (B) block having affinity for the polyolefin resin.

The functional group in the above segment (A) block is not particularly restricted but includes, among others, carboxyl, epoxy and other functional groups capable of being chemically bound to those hydroxyl groups occurring on the crystal surface of the layered silicate or having chemical affinity for such hydroxyl groups.

The above segment (A) block preferably has a large number of such functional groups as mentioned above in the molecular. The molecular weight of the above segment (A) block is not particularly restricted but preferably is $1 \times 10^4$ to $5 \times 10^4$. When it exceeds $5 \times 10^4$, the degree of freedom of the segment (A) block decreases and the reactivity with the layered silicate may possibly be impaired.

The above segment (B) block is preferably of the same type as the polyolefin resin used as the main constituent of the polyolefin resin composition of the invention and, more preferably, is quite the same as the polyolefin resin.

The molecular weight of the above segment (B) block is not particularly restricted but preferably is $1 \times 10^4$ to $5 \times 10^4$. When it exceeds $5 \times 10^4$, the degree of freedom of the segment (B) block decreases and any satisfactory dispersion improving effect may not be obtained.

The AB type block copolymer comprising the above segment (A) block and segment (B) block, unlike ABA type block copolymers, has the segment (A) block having functional groups showing reactivity with the polyolefin resin and the segment (B) block having affinity for the polyolefin resin located at the respective ends thereof and, therefore, can efficiently promote the delamination of the above layered silicate and improve the dispersibility of the layered silicate in the polyolefin resin.

Preferably, the polyolefin resin composition of the present invention further contains an aromatic hydroxyl-containing compound for attaining still improved flame retardancy.

The aromatic hydroxyl-containing compound is not particularly restricted but may be any of those which are capable of capturing radicals, for example 2,6-di-tert-butyl-p-cresol, 2,6-di-tert-butyl-4-ethylphenol, 2,2'-methylenebis(4-methyl-6-tert-butylphenol), triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2'-thiodiethylene bis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxy-hydroxycinnamide), diethyl 3,5-di-tert-butyl-4-hydroxybenzylphosphonate, 1,3,5-trimethyl-2,4,6-tris(3,5-di-tert-butyl-4-hydroxybenzyl)benzene, calcium bis(ethyl 3,5-di-tert-butyl-4-hydroxybenzylphosphonate), tris-(3,5-di-tert-butyl-4-hydroxybenzyl)isocyanurate, 2,4-bis[(octylthio)methyl]-o-cresol, isooctyl-3-(3,5-di-tert-butyl-4-hydroxyphenyl)propionate, 3,9-bis{1, 1-dimethyl-2-[β-(3-tert-butyl-4-hydroxy-5-methylphenyl) propionyloxy]ethyl}-2,4,8,10-tetraoxaspiro [5.5] undecane, p-phenylphenol and gallic acid. These aromatic hydroxyl-containing compounds may be used singly or two or more of them may be used in combination.

The aromatic hydroxyl-containing compound mentioned above captures radicals formed as decomposition products in the process of combustible gas formation upon thermal decomposition of the polyolefin resin under high temperature condition on the occasion of combustion thereof and thereby functionally retards combustion reactions.

The addition amount of the above aromatic hydroxyl-containing compound is preferably 0.01 to 30 parts by weight per 100 parts by weight of the polyolefin resin. When it is less than 0.01 part by weight, the flame retardancy improving effect may be unsatisfactory. When, on the other hand, it exceeds 30 parts by weight, the physical properties of the polyolefin resin composition may decrease or the layered silicate may be prevented from forming sintered coats. An addition amount of 0.05 to 10 parts by weight is more preferred.

In the polyolefin resin composition of the invention, there may be incorporated, where necessary, one or more of various additives, such as nucleating agents for making crystals of the polyolefin resin finer to thereby make the physical properties thereof uniform, antioxidants, heat stabilizers, light stabilizers, uv absorbers, lubricants, processing auxiliaries, flame retardants, and antistatic agents, unless the accomplishment of the objects of the present invention is inhibited.

The polyolefin resin composition of the present invention can be prepared by one of various methods. The method of producing the polyolefin resin composition of the invention is not particularly restricted but includes, for example, (1) the method comprising melting and kneading the polyolefin resin and layered silicate, which are the essential constituents, optionally together with one or more of the above-mentioned various flame retardancy improving agents preferably to be contained in the composition and/or one or more of various additives to be added as necessary, in an extruder, twin roll or Banbury mixer, for instance, (2) the method comprising compounding (mixing) the polyolefin resin and layered silicate together in an organic solvent in which both constituents are soluble, and (3) the method comprising polymerizing an olefinic monomer(s) in the presence of the layered silicate containing a transition metal complex to thereby effect the compounding.

The transition metal complex to be used in the above method (3) is not particularly restricted but may be any of those capable of causing olefinic monomers to polymerize, for example complexes of metals of the group 4, 5, 10 or 11.

The field of application of the polyolefin resin composition of the invention is not particularly restricted but includes a wide range of fields where flame retardancy is required, such as the fields of cable jacketing or sheathing and decorative sheet production. In particular, the resin composition can suitably be used as a resin for cable jacketing or sheathing. The resin for cable jacketing or sheathing is required to have flame retardancy so that, on the occasion of fire, the fire can be prevented from spreading via the cable (JIS C 3005).

A thermoplastic resin for cable jacketing or sheathing, which comprises the polyolefin resin composition of the invention, constitutes a further aspect of the present invention. An insulated cable which comprises the above thermoplastic resin also constitutes a still further aspect of the present invention.

BEST MODES FOR CARRYING OUT THE INVENTION

The following examples illustrate the present invention in further detail. These examples are, however, by no means limitative of the scope of the invention. In the examples, "part(s)" means "part(s) by weight".

EXAMPLE 1

1. Exchange of a Transition Metal Complex for Metal Ions in a Layered Silicate.

A beaker was charged with 5 g of montmorillonite (trademark: "Bengel A", product of Hojun Kogyo) and 495 g of distilled water, xylene (reagent grade, product of Wako Pure Chemical Industries) was further added for increasing the interlayer distance, and a swollen montmorillonite slurry was prepared by stirring the mixture at ordinary temperature for about 2 hours using a motor stirrer. Then, 0.27 g of dicyclopentadienyltitanium dichloride distearyldimethylammonium was added to the above swollen slurry, and the mixture was stirred at ordinary temperature for 24 hours using a motor stirrer. Thereafter, the solid matter was separated using a centrifuge. For removing unnecessary components adhering to the solid matter, the solid matter was redispersed in distilled water and then separated using a centrifuge. This procedure was repeated twice. The solid matter thus obtained was vacuum-dried at 50° C. for 48 hours using a vacuum drier, and the thus-obtained composition was used as an organic layered silicate containing transition metal complex. The yield was 5.10 g. Hereinafter, this is referred to as MMT-A.

2. Ethylene Polymerization

A 300-mL vessel made of glass durable under high pressure was purged with argon and, then, 5.00 g of MMT-A, namely the an organic layered silicate containing transition metal complex (dicyclopentadienyltitanium dichloride distearyldimethylammonium-added montmorillonite) prepared in advance, was added and dissolved in 150 mL of toluene. Furthermore, 30 mL of methylalumoxane (10% by weight toluene solution, product of Aldrich) was added dropwise from a syringe over 10 minutes. Then, gaseous ethylene was introduced into the vessel and the polymerization was carried out at 0° C. for 4 hours while the system was maintained at 1.1 kg/cm². Thereafter, the reaction was terminated by addition of 300 mL of methanol to the system. The precipitated polymer was recovered, and 13.5 g of a layered silicate/polymer composite composition (I) was obtained.

The layered silicate/polymer composite composition (I) obtained was analyzed using a Fourier transform infrared spectrometer (FT-IR), thereby a peak ascribable to polyethylene was observed at 721 cm⁻¹. Further, analysis using a thermogravimetric analyzer (TGA) revealed that the inorganic matter content in the layered silicate/polymer composite composition (I) obtained was 46% by weight.

3. Composition of a Polyethylene Resin and a Layered Silicate

A polyethylene resin (trademark "HB 530", product of Japan Polychem) and the layered silicate/polymer composite composition (I) were fed, in a weight ratio of 92.3/7.7, to a small-sized extruder (trademark "TEX 30", product of the Japan Steel Works), the mixed feed was melted and kneaded at a preset temperature of 200° C. and the strand extruded was pelletized using a pelletizer. The pellet obtained was molded into a 3-mm-thick or 100-μm-thick plate using a hot press maintained at a temperature of 200° C. Evaluation samples were thus produced.

EXAMPLE 2

1. Synthesis of an Organic Layered Silicate Containing Transition Metal Complex and Alkylammonium Salt A 1-liter beaker was charged with 5 g of montmorillonite (trademark: "Bengel A", product of Hojun Kogyo) and 495 g of distilled water, xylene (reagent grade, product of Wako Pure Chemical Industries) was further added for increasing the interlayer distance, and a swollen montmorillonite slurry was prepared by stirring the mixture at ordinary temperature for about 2 hours using a motor stirrer. Then, 0.27 g of dicyclopentadienyltitanium dichloride was added to the above swollen slurry, and the mixture was stirred at ordinary temperature for 24 hours using a motor stirrer. Further, 2.88 g of distearyldimethylammonium chloride (product of Wako Pure Chemical Industries), as a cationic surfactant, and 0.001 g of concentrated hydrochloric acid were added to the above swollen slurry, and the mixture was stirred at ordinary temperature for 8 hours using a motor stirrer. Thereafter, the solid matter was separated using a centrifuge. For removing unnecessary components adhering to the above solid matter, the solid matter was redispersed in distilled water and then separated using a centrifuge. This procedure was repeated twice. The solid matter thus obtained was vacuum-dried at 50° C. for 48 hours using a vacuum drier, and the thus-obtained composition was used as an organic layered silicate containing transition metal complex and alkylammonium salt. The yield was 8.01 g. Hereinafter, this is referred to as MMT-B.

2. Ethylene Polymerization

A 300-mL vessel made of glass durable under high pressure was purged with argon and, then, 7.00 g of MMT-B, namely the organic layered silicate containing transition metal complex and alkylammonium salt (dicyclopentadienyltitanium dichloride distearyldimethylammonium chloride-added montmorillonite) prepared in advance, was added and dissolved in 150 mL of toluene. Furthermore, 30 mL of methylalumoxane (10% (by weight) toluene solution, product of Aldrich) was added dropwise from a syringe over 10 minutes. Then, gaseous ethylene was introduced into the vessel and the polymerization was carried out at 0° C. for 4 hours while the system was maintained at 1.1 kg/cm². Thereafter, the reaction was terminated by addition of 300 mL of methanol to the system. The precipitated polymer was recovered, and 17.5 g of a layered silicate/polymer composite composition (II) was obtained.

The layered silicate/polymer composite composition (II) obtained was analyzed using a Fourier transform infrared spectrometer (FT-IR), thereby a peak ascribable to polyethylene was observed at 721 cm⁻¹. Further, analysis using a thermogravimetric analyzer (TGA) revealed that the inorganic matter content in the layered silicate/polymer composite composition (II) obtained was 43% by weight.

3. Composition of a Polyethylene Resin and a Layered Silicate

A polyethylene resin (trademark "HB 530", product of Japan Polychem) and the layered silicate/polymer composite composition (II) were fed, in a weight ratio of 92.3/7.7, to a small-sized extruder (trademark "TEX 30", product of the Japan Steel Works), the mixed feed was melted and kneaded at a preset temperature of 200° C. and the strand extruded was pelletized using a pelletizer. The pellet obtained was molded into a 3-mm-thick or 100-μm-thick plate using a hot press maintained at 200° C. Evaluation samples were thus produced.

EXAMPLE 3

A 2% by weight aqueous solution (100 g) of vinyltrimethoxysilane (reagent grade, product of Shin-Etsu Chemical) was added dropwise, over 3 minutes, to 500 g of distearyldimethyl quaternary ammonium salt-treated montmorillonite (trademark "New S-Ben D", product of Hojun Kogyo) with stirring in a Henschel mixer. After completion of the dropping, the mixture was further stirred for 10 minutes. The thus-treated powder was retained and dried in a vacuum drier maintained at 70° C. for 8 hours. The powder obtained is referred to as MMT-C.

A polypropylene resin (trademark "EA 9", product of Japan Polychem) and MMT-C were fed, in a weight ratio of 92.3/7.7, to a small-sized extruder (trademark "TEX 30", product of the Japan Steel Works). Further, for subjecting the unsaturated bond contained in vinyltrimethoxysilane to graft reaction with the polypropylene resin, an peroxide, 2,5-dimethyl-2,5-bis(tert-butylperoxy)hexane (trademark "Perhexa 25B", temperature making the half-life 1 minute: 180° C. product of NOFCO), was used. The above peroxide was added to a level of 0.1% by weight relative to the polypropylene resin using a plunger pump. The resultant mixture was melted and kneaded at a preset temperature of 200° C. and the strand extruded was pelletized using a pelletizer. The pellet obtained was molded into a 3-mm-thick or 100-μm-thick plate or sheet using a hot press maintained at 200° C. Evaluation samples were thus produced.

EXAMPLE 4

Montmorillonite (trademark "Bengel A", product of Hojun Kogyo) subjected in advance to ion exchange with a distearyldimethyl-quaternary-ammonium salt was used as the layered silicate. This is referred to as MMT-D. Used as a polypropylene resin was a composition comprising 15 parts of a maleic anhydride-modified propylene oligomer (trademark "Umex 1001", functional group content: 0.23 mmol/g, product of Sanyo Chemical Industries) added to 100 parts of a polypropylene resin (trademark "EA 9", product of Japan Polychem) for increasing the affinity of polypropylene resin for the layered silicate.

The above polypropylene resin and layered silicate were fed to a laboratory plastomill (product of Toyo Seiki) and melted and kneaded at a preset temperature of 200° C. The composition was polypropylene resin/maleic anhydride-modified polypropylene oligomer/MMT-D=82.3/10/7.7 (weight ratio).

The composite composition obtained was preheated to 200° C. on a melt press for 5 minutes and then pressed at a pressure of 9.8 MPa for 1 minute to give a 1-mm-thick sheet-like molding. The 1-mm-thick sheet was cut to 3 cm square pieces, which were placed in an autoclave. The autoclave was hermetically closed and the inside temperature was set at a temperature higher by 10° C. than the melting point of the polypropylene resin. Then, gaseous carbon dioxide was injected into the autoclave under high pressure, and the autoclave inside pressure was maintained at 16.7 MPa for 30 minutes. Furthermore,. the autoclave inside temperature was set at a temperature lower by 10° C. than the melting point of the polypropylene resin and, in that condition, the gas was discharged at once from the autoclave to put the inside pressure back to ordinary pressure. The thus-obtained foamed body was molded into a 3-mm-thick or 100-μm-thick plate using a hot press maintained at 200° C. Evaluation samples were thus produced.

EXAMPLE 5

A polypropylene resin (trademark "EA 9", product of Japan Polychem; 82.3 parts), 5 parts of a maleic anhydride-modified propylene oligomer (trademark "Umex 1001", functional group content: 0.23 mmol/g, product of Sanyo Chemical Industries) and 7.7 parts of MMT-D were fed to a small-sized extruder (trademark "TEX 30", product of the Japan Steel Works) and melted and kneaded at a preset temperature of 200° C. The strand extruded was pelletized using a pelletizer. The pellet obtained was molded into a 3-mm-thick or 100-μm-thick plate or sheet using a hot press maintained at 200° C. Evaluation samples were thus produced.

EXAMPLE 6

Evaluation samples were produced in the same manner as in Example 5 except that 5 parts of ammonium polyphosphate (trademark "AP 422", product of Japan Polyolefin) was added to the small-sized extruder (trademark "TEX 30", product of the Japan Steel Works).

EXAMPLE 7

Evaluation samples were produced in the same manner as in Example 6 except that 5 parts of phenylphosphonic acid (product of Daihachi Chemical Industry) was added in lieu of 5 parts of ammonium polyphosphate.

EXAMPLE 8

Evaluation samples were produced in the same manner as in Example 6 except that 25 parts of higher fatty acid-treated magnesium hydroxide (trademark "Kisuma 5J", product of Kyowa Chemical Industry) was added in lieu of 5 parts of ammonium polyphosphate.

EXAMPLE 9

Evaluation samples were produced in the same manner as in Example 6 except that 20 parts of melamine cyanurate (product of Nissan Chemical Industries) was added in lieu of 5 parts of ammonium polyphosphate.

EXAMPLE 10

Evaluation samples were produced in the same manner as in Example 6 except that 5 parts of talc (trademark "P-6", mean particle diameter: 3.7 μm, product of Nippon Talc) was added in lieu of 5 parts of ammonium polyphosphate.

EXAMPLE 11

Evaluation samples were produced in the same manner as in Example 6 except that 5 parts of a block copolymer comprising a polypropylene block and a carboxylic acid-modified polypropylene block (trademark "CB-OM 12", molecular weights of segment (A) block and segment (B) block: each $1.5 \times 10^4$, product of Kuraray) was added in lieu of 5 parts of ammonium polyphosphate and that the maleic anhydride-modified propylene oligomer was not added.

EXAMPLE 12

Evaluation samples were produced in the same manner as in Example 5 except that an ethylene-ethyl acrylate copolymer (trademark "A 4250", product of Japan Polyolefin) and a maleic anhydride-modified ethylene oligomer (trademark "ER 403A", product of Japan Polyolefin) were used in lieu of the polypropylene resin and maleic anhydride-modified propylene oligomer, respectively.

EXAMPLE 13

Evaluation samples were produced in the same manner as in Example 12 except that the maleic anhydride-modified ethylene oligomer (trademark "ER 403A", product of Japan Polyolefin) was not used.

EXAMPLE 14

Evaluation samples were produced in the same manner as in Example 8 except that an ethylene-ethyl acrylate copolymer (trademark "A 4250", product of Japan Polyolefin) and a maleic anhydride-modified ethylene oligomer (trademark "ER 403A", product of Japan Polyolefin) were used in lieu of the polypropylene resin and maleic anhydride-modified propylene oligomer, respectively.

EXAMPLE 15

Evaluation samples were produced in the same manner as in Example 14 except that 1.5 parts of copper(II) oxide (product of Nisshin Chemco) was further added.

EXAMPLE 16

Evaluation samples were produced in the same manner as in Example 15 except that 1.0 part of tin(II) oxide (product of Showa Kako) was added in lieu of 1.5 parts of copper(II) oxide.

EXAMPLE 17

Evaluation samples were produced in the same manner as in Example 15 except that 1.0 part of zinc oxide (product of Sakai Chemical Industry) was added in lieu of 1.5 parts of copper(II) oxide.

EXAMPLE 18

Evaluation samples were produced in the same manner as in Example 14 except that 2.0 parts of p-phenylphenol was further added.

EXAMPLE 19

A polyethylene resin (trademark "HB 530", product of Japan Polychem; 87.3 parts) and 7.7 parts of MMT-D were fed to a small-sized extruder (trademark "TEX 30", product of the Japan Steel Works) and melted and kneaded at a preset temperature of 200° C. The strand extruded was pelletized using a pelletizer. The pellet obtained was molded into a 3-mm-thick or 100-µm-thick plate using a hot press maintained at 200° C. Evaluation samples were thus produced.

EXAMPLE 20

Evaluation samples were produced in the same manner as in Example 19 except that 5 parts of ammonium polyphosphate (trademark "AP 422", product of Japan Polyolefin) was further added.

EXAMPLE 21

Evaluation samples were produced in the same manner as in Example 20 except that the polyethylene resin (trademark "HB 530", product of Japan Polychem) was used in an amount of 85.3 parts and that 2 parts of trihydroxyethyl isocyanurate (THEIC) was further added.

EXAMPLE 22

A beaker was charged with 5 g of montmorillonite (trademark: "Bengel A", product of Hojun Kogyo) and 495 g of distilled water, and a swollen montmorillonite slurry was prepared by stirring the mixture at ordinary temperature for about 2 hours using a motor stirrer. Then, 0.27 g of dodecyltriphenylphosphonium bromide was added to the above swollen slurry, and the mixture was stirred at ordinary temperature for 24 hours using a motor stirrer. Thereafter, the solid matter was separated using a centrifuge. For removing unnecessary components adhering to the above solid matter, the solid matter was redispersed in distilled water and then separated using a centrifuge. This procedure was repeated twice. The solid matter thus obtained was vacuum-dried at 50° C. for 48 hours using a vacuum-drier, and the thus-obtained composition was used as a phosphonium salt-containing layered silicate. The yield was 5.10 g. This is referred to as MMT-E. Analysis using a thermogravimetric analyzer (TGA) revealed that the inorganic matter content in MMT-E was 46% by weight.

A polypropylene resin (trademark "EA 9", product of Japan Polychem; 82.3 parts), 7.7 parts of a maleic anhydride-modified propylene oligomer (trademark "Umex 1001", functional group content: 0.23 mmol/g, product of Sanyo Chemical Industries) and 7.7 parts of MMT-E were fed to a small-sized extruder (trademark "TEX 30", product of the Japan Steel Works) and melted and kneaded at a preset temperature of 200° C. The strand extruded was pelletized using a pelletizer. The pellet obtained was molded into a 3-mm-thick or 100-µm-thick plate using a hot press maintained at 200° C. Evaluation samples were thus produced.

EXAMPLE 23

Evaluation samples were produced in the same manner as in Example 22 except that 5 parts of ammonium polyphosphate (trademark "AP 422", product of Japan Polyolefin) was further added.

EXAMPLE 24

Evaluation samples were produced in the same manner as in Example 22 except that 20 parts of higher fatty acid-treated magnesium hydroxide (trademark "Kisuma 5J", product of Kyowa Chemical Industry) was further added.

EXAMPLE 25

Evaluation samples were produced in the same manner as in Example 22 except that 20 parts of silane coupling agent-treated magnesium hydroxide (trademark "Kisuma 5PH", product of Kyowa Chemical Industry) was further added.

EXAMPLE 26

Evaluation samples were produced in the same manner as in Example 22 except that 20 parts of melamine cyanurate (product of Nissan Chemical Industries) was further added.

EXAMPLE 27

Evaluation samples were produced in the same manner as in Example 22 except that a block copolymer comprising a polypropylene block and a carboxylic acid-modified polypropylene block (trademark "CB-OM 12", molecular weights of segment (A) block and segment (B) block: each $1.5 \times 10^4$, product of Kuraray) was used in lieu of the maleic anhydride-modified propylene oligomer.

EXAMPLE 28

Evaluation samples were produced in the same manner as in Example 22 except that a polyethylene resin (trademark "HB 530", product of Japan Polychem) and a maleic anhydride-modified ethylene oligomer (trademark "ER 403A", product of Japan Polyolefin) were used in lieu of the polypropylene resin and maleic anhydride-modified propylene oligomer, respectively.

EXAMPLE 29

Evaluation samples were produced in the same manner as in Example 28 except that 5 parts of ammonium polyphosphate (trademark "AP 422", product of Japan Polyolefin) was further added.

EXAMPLE 30

Evaluation samples were produced in the same manner as in Example 28 except that 20 parts of higher fatty acid-treated magnesium hydroxide (trademark "Kisuma 5J", product of Kyowa Chemical industry) was further added.

EXAMPLE 31

Evaluation samples were produced in the same manner as in Example 28 except that 20 parts of silane coupling agent-treated magnesium hydroxide (trademark "Kisuma 5PH", product of Kyowa Chemical Industry) was further added.

EXAMPLE 32

Evaluation samples were produced in the same manner as in Example 28 except that 20 parts of melamine cyanurate (product of Nissan Chemical Industries) was further added.

EXAMPLE 33

Evaluation samples were produced in the same manner as in Example 28 except that 20 parts of magnesium hydroxide (trademark "Kisuma 5J", product of Kyowa Chemical Industry) and 1.5 parts of copper(II) oxide (product of Nissin Chemco) were further added.

EXAMPLE 34

Evaluation samples were produced in the same manner as in Example 28 except that a block copolymer comprising a polyethylene block and a carboxylic acid-modified polyethylene block (trademark "CB-OM 22", product of Kuraray) was added in lieu of the maleic anhydride-modified ethylene oligomer.

EXAMPLE 35

A beaker was charged with 5 g of montmorillonite (trademark: "Bengel A", product of Hojun Kogyo) and 495 g of distilled water, and a swollen montmorillonite slurry was prepared by stirring the mixture at ordinary temperature for about 2 hours using a motor stirrer. Then, 0.7 g of nickel chloride (product of Wako Pure Chemical Industries) was added to the above swollen slurry, and the mixture was further stirred at ordinary temperature for 4 hours using a motor stirrer. Then, 0.7 g of a distearyldimethyl-quaternary-ammonium salt was added, and the mixture was stirred for 24 hours. Thereafter, the solid matter was separated using a centrifuge. For removing unnecessary components adhering to the above solid matter, the solid matter was redispersed in distilled water and then separated using a centrifuge. This procedure was repeated twice. The solid matter thus obtained was vacuum-dried at 50° C. for 48 hours using a vacuum drier, and the thus-obtained composition was used as a nickel ion-exchanged layered silicate. The yield was 5.10 g. Hereinafter, this is referred to as MMT-F. Analysis of this MMT-F using a thermogravimetric analyzer (TGA) revealed that the inorganic matter content in MMT-F was 80% by weight.

A polypropylene resin (trademark "EA 9", product of Japan Polychem; 82.3 parts), 7.7 parts of a maleic anhydride-modified propylene oligomer (trademark "Umex 1001", functional group content: 0.23 mmol/g, product of Sanyo Chemical Industries), 5 parts of ammonium polyphosphate (trademark "AP 422", product of Japan Polyolefin) and 7.7 parts of MMT-F were fed to a small-sized extruder (trademark "TEX 30", product of the Japan Steel Works) and melted and kneaded at a preset temperature of 200° C. The strand extruded was pelletized using a pelletizer. The pellet obtained was molded into a 3-mm-thick or 100-μm-thick plate using a hot press maintained at 200° C. Evaluation samples were thus produced.

EXAMPLE 36

Evaluation samples were produced in the same manner as in Example 35 except that a polyethylene resin (trademark "HB 530", product of Japan Polychem) and a maleic anhydride-modified ethylene oligomer (trademark "ER 403A", product of Japan Polyolefin) were used in lieu of the polypropylene resin and maleic anhydride-modified propylene oligomer, respectively.

COMPARATIVE EXAMPLE 1

Evaluation samples were produced in the same manner as in Example 1 except that the polypropylene resin (trademark "EA 9", product of Japan Polychem) was used alone without adding any layered silicate.

COMPARATIVE EXAMPLE 2

Evaluation samples were produced in the same manner as in Example 1 except that 100 parts of ammonium polyphosphate (trademark "AP 422", product of Japan Polyolefin) was added to 100 parts of the polypropylene resin (trademark "EA 9", product of Japan Polychem) without adding any layered silicate.

COMPARATIVE EXAMPLE 3

Evaluation samples were produced in the same manner as in Example 1 except that 100 parts of aluminum hydroxide (metal hydroxide) was added to 100 parts of the polypropylene resin (trademark "EA 9", product of Japan Polychem) without adding any layered silicate.

COMPARATIVE EXAMPLE 4

Evaluation samples were produced in the same manner as in Example 1 except that 7.7 parts of purified montmorillonite (trademark "Kunipia F", product of Kunimine Industries) was added, without any ion exchange, to 92.3 parts of the polypropylene resin (trademark "EA 9", product of Japan Polychem).

COMPARATIVE EXAMPLE 5

Evaluation samples were produced in the same manner as in Example 1 except that 7.7 parts of distearyldimethyl-quaternary-ammonium salt-treated montmorillonite (trademark "New S-Ben D", product of Hojun Kogyo) was added to 92.3 parts of the polypropylene resin (trademark "EA 9", product of Japan Polychem).

COMPARATIVE EXAMPLE 6

Evaluation samples were produced in the same manner as in Comparative Example 3 except that a polyethylene resin (trademark "HB 530", product of Japan Polychem) was used in lieu of the polypropylene resin.

COMPARATIVE EXAMPLE 7

Evaluation samples were produced in the same manner as in Comparative Example 3 except that an ethylene-ethyl acrylate copolymer (trademark "A 4250", product of Japan Polyolefin) was used in lieu of the polypropylene resin.

The evaluation samples obtained in Examples 1 to 36 and Comparative Examples 1 to 7 were evaluated for performance characteristics ((1) mean interlayer distance, (2) elongation, (3) combustion residue condition and yield point stress, (4) maximum heat release rate, and (5) self-extinguishing tendency) by the following methods. The results are shown in Table 1 and Table 2.

(1) Mean interlayer distance: The value of 2θ was determined for the diffraction peak resulting from diffraction by laminated layer faces of the layered silicate in each evaluation sample as found by using an X ray diffractometer (trademark "RINT 1100", product of Rigaku International), and the (001) face-to-(001) face spacing of the layered silicate was calculated according to the following "Bragg condition for diffraction":

$$\lambda = 2d \sin \theta (\theta = 1.54d: \text{ spacing in layered silicate; } \theta: \text{ angle of diffraction}).$$

The value of d as obtained from the above formula was reported as the mean interlayer distance.

(2) Elongation: No. 3 dumbbell test specimens prepared from each evaluation sample were measured for elongation at break in a range up to 750% in an atmosphere at 20 ° C. and 50% RH according to JIS K 6251 "Tensile testing Methods of vulcanized rubber". In cases where no breakage occurred until 750%, the elongation was recorded as "not less than 750%" and, when breakage occurred before 750%, the elongation at break was recorded.

(3) Combustion residue condition and yield point stress: Each test specimen (100 mm×100 mm×3 mm thick) of each evaluation sample was combusted by irradiation with 50 kW/m$^2$ heat rays using a cone calorimeter according to ASTM E 1354 "Testing methods for flammability of building materials". Then, the condition of the combustion residue was evaluated by visual observation and the yield point stress of the combustion residue when this was compressed at a rate of 0.1 cm/s was measured.

[Evaluation criteria]

| | |
|---|---|
| ○ | Yield point stress not less than 4.9 × 10³ Pa |
| ◎ | Yield point stress not less than 1.5 × 10⁴ Pa |

(4) Maximum heat release rate: Each test specimen (100 mm×100 mm×3 mm thick) of each evaluation sample was combusted by irradiation with 50 kW/m² heat rays using a cone calorimeter in the same manner as in (3) above, and the maximum heat release rate (in kW/m²) was determined.

[Evaluation criteria]

| | |
|---|---|
| ○ | Maximum heat release rate not more than 800 kW/m² |
| X | Maximum heat release rate more than 800 kW/m² |

(5) Self-extinguishing tendency: Test specimens (70 mm×6 mm×3 mm thick) prepared from each evaluation sample were allowed to be in a self-standing state and subjected to the combustion test according to the ASTM D 2863 standard method of "Testing method for flammability of plastics using oxygen index", and the self-extinguishing tendency was evaluated according to the following evaluation criteria. In this test, the minimum oxygen concentration (% by volume) in an oxygen-nitrogen mixed gas as required to maintain the combustion of the test specimen is referred to as "oxygen index". Thus, when combustion is carried out at a predetermined oxygen concentration and the combustion can be maintained for at least 3 minutes or at least 50 mm of the test specimen is combusted within 3 minutes, the combustion is regarded as being maintainable and the oxygen concentration on that occasion is reported as the oxygen index of the test specimen. Thus, it is meant that at an oxygen concentration below the oxygen index, the test specimen is extinguished by itself.

TABLE 1

| Ex. | Polyolefin | Layered silicate | Flame retardant | | Other additive |
|---|---|---|---|---|---|
| 1 | Polyethylene | MMT-A | — | | — |
| 2 | Polyethylene | MMT-B | — | | — |
| 3 | Polypropylene | MMT-C | — | | — |
| 4 | Polypropylene | MMT-D | — | | Maleic anhydride-modified propylene oligomer |
| 5 | Polypropylene | MMT-D | — | | Maleic anhydride-modified propylene oligomer |
| 6 | Polypropylene | MMT-D | Ammonium polyphosphate | | Maleic anhydride-modified propylene oligomer |
| 7 | Polypropylene | MMT-D | Phenylphosphonic acid | | Maleic anhydride-modified propylene oligomer |
| 8 | Polypropylene | MMT-D | Magnesium hydroxide (KISUMA5J) | | Maleic anhydride-modified propylene oligomer |
| 9 | Polypropylene | MMT-D | Melamine cyanurate | | Maleic anhydride-modified propylene oligomer |
| 10 | Polypropylene | MMT-D | Talc | | Maleic anhydride-modified propylene oligomer |
| 11 | Polypropylene | MMT-D | — | | Carboxylic acid-modified PP |
| 12 | EEA | MMT-D | — | | Maleic anhydride-modified ethylene oligomer |
| 13 | EEA | MMT-D | — | | — |
| 14 | EEA | MMT-D | Magnesium hydroxide (KISUMA5J) | | Maleic anhydride-modified ethylene oligomer |
| 15 | EEA | MMT-D | Magnesium hydroxide (KISUMA5J) | Copper oxide | Maleic anhydride-modified ethylene oligomer |
| 16 | EEA | MMT-D | Magnesium hydroxide (KISUMA5J) | Tin oxide | Maleic anhydride-modified ethylene oligomer |
| 17 | EEA | MMT-D | Magnesium hydroxide (KISUMA5J) | Zinc oxide | Maleic anhydride-modified ethylene oligomer |
| 18 | EEA | MMT-D | Magnesium hydroxide (KISUMA5J) | PPP | Maleic anhydride-modified ethylene oligomer |
| 19 | Polyethylene | MMT-D | — | | Maleic anhydride-modified ethylene oligomer |
| 20 | Polyethylene | MMT-D | Ammonium polyphosphate | | — |
| 21 | Polyethylene | MMT-D | Ammonium polyphosphate | THEIC | — |
| 22 | Polyethylene | MMT-D | — | | Maleic anhydride-modified propylene oligomer |
| 23 | Polypropylene | MMT-E | Ammonium polyphosphate | | Maleic anhydride-modified propylene oligomer |
| 24 | Polypropylene | MMT-E | Magnesium hydroxide (KISUMA5J) | | Maleic anhydride-modified propylene oligomer |
| 25 | Polypropylene | MMT-E | Magnesium hydroxide (KISUMA6PH) | | Maleic anhydride-modified propylene oligomer |
| 26 | Polypropylene | MMT-E | Melamine cyanurate | | Maleic anhydride-modified propylene oligomer |
| 27 | Polypropylene | MMT-E | — | | Carboxylic acid-modified PP |
| 28 | Polyethylene | MMT-E | — | | Maleic anhydride-modified ethylene oligomer |

TABLE 1-continued

| Ex. | Polyolefin | Layered silicate | Flame retardant | Other additive |
|---|---|---|---|---|
| 29 | Polyethylene | MMT-E | Ammonium polyphosphate | Maleic anhydride-modified ethylene oligomer |
| 30 | Polyethylene | MMT-E | Magnesium hydroxide (KISUMA5J) | Maleic anhydride-modified ethylene oligomer |
| 31 | Polyethylene | MMT-E | Magnesium hydroxide (KISUMA6PH) | Maleic anhydride-modified ethylene oligomer |
| 32 | Polyethylene | MMT-E | Melamine cyanurate | Maleic anhydride-modified ethylene oligomer |
| 33 | Polyethylene | MMT-E | Magnesium hydroxide (KISUMA5J) Copper oxide | Maleic anhydride-modified ethylene oligomer |
| 34 | Polyethylene | MMT-E | — | Carboxylic acid-modified PE |
| 35 | Polyethylene | MMT-F | Ammonium polyphosphate | Maleic anhydride-modified ethylene oligomer |
| 36 | Polyethylene | MMT-F | Ammonium polyphosphate | Maleic anhydride-modified ethylene oligomer |
| 1 | Polypropylene | — | — | — |
| 2 | Polypropylene | — | Ammonium polyphosphate | — |
| 3 | Polypropylene | — | Alminum hydroxide | — |
| 4 | Polypropylene | Purified MMT | — | — |
| 5 | Polypropylene | new S-BEN D | — | — |
| 6 | Polyethylene | — | Alminum hydroxide | — |
| 7 | EEA | — | Alminum hydroxide | — |

TABLE 2

| | Mean interlayer distance | Elongation (%) | Combustion residue | Yield point stress (kPa) |
|---|---|---|---|---|
| Ex. | | | | |
| 1 | Not less than 6 nm | Not less than 750 | ⊙ | 15 |
| 2 | Not less than 6 nm | Not less than 750 | ⊙ | 16 |
| 3 | Not less than 6 nm | Not less than 750 | ⊙ | 19 |
| 4 | Not less than 6 nm | Not less than 750 | ⊙ | 22 |
| 5 | 3 nm | Not less than 750 | ○ | 10 |
| 6 | Not less than 6 nm | Not less than 750 | ○ | 23 |
| 7 | Not less than 6 nm | Not less than 750 | ○ | 21 |
| 8 | Not less than 6 nm | Not less than 750 | ⊙ | 30 |
| 9 | Not less than 6 nm | Not less than 750 | ⊙ | 25 |
| 10 | Not less than 6 nm | Not less than 750 | ⊙ | 23 |
| 11 | Not less than 6 nm | Not less than 750 | ⊙ | 23 |
| 12 | 4 nm | Not less than 750 | ○ | 12 |
| 13 | 4 nm | Not less than 750 | ○ | 11 |
| 14 | Not less than 6 nm | Not less than 750 | ○ | 31 |
| 15 | Not less than 6 nm | Not less than 750 | ○ | 30 |
| 16 | Not less than 6 nm | Not less than 750 | ○ | 30 |
| 17 | Not less than 6 nm | Not less than 750 | ○ | 30 |
| 18 | Not less than 6 nm | Not less than 750 | ○ | 30 |
| 19 | 4 nm | Not less than 750 | ○ | 14 |
| 20 | Not less than 6 nm | Not less than 750 | ○ | 27 |
| 21 | Not less than 6 nm | Not less than 750 | ○ | 35 |
| 22 | Not less than 6 nm | Not less than 750 | ⊙ | 25 |
| 23 | Not less than 6 nm | Not less than 750 | ⊙ | 27 |
| 24 | Not less than 6 nm | Not less than 750 | ⊙ | 26 |
| 25 | Not less than 6 nm | Not less than 750 | ⊙ | 26 |
| 26 | Not less than 6 nm | Not less than 750 | ⊙ | 30 |
| 27 | Not less than 6 nm | Not less than 750 | ⊙ | 25 |
| 28 | Not less than 6 nm | Not less than 750 | ⊙ | 26 |
| 29 | Not less than 6 nm | Not less than 750 | ⊙ | 30 |
| 30 | Not less than 6 nm | Not less than 750 | ⊙ | 20 |
| 31 | Not less than 6 nm | Not less than 750 | ⊙ | 20 |
| 32 | Not less than 6 nm | Not less than 750 | ⊙ | 20 |
| 33 | Not less than 6 nm | Not less than 750 | ⊙ | 30 |
| 34 | Not less than 6 nm | Not less than 750 | ⊙ | 25 |
| 35 | Not less than 6 nm | Not less than 750 | ⊙ | 35 |
| 36 | Not less than 6 nm | Not less than 750 | ⊙ | 35 |
| Compar. Ex. | | | | |
| 1 | — | Not less than 750 | No residue formation | — |
| 2 | — | 350 | Local coat formation | 3.0 |
| 3 | — | 450 | Expanded combution residue | 4.0 |
| 4 | 1.4 nm | 250 | Local coat formation | 1.0 |
| 5 | 3.5 nm | Not less than 750 | Local coat formation | 3.0 |

TABLE 2-continued

| Mean interlayer distance | Elongation (%) | Combustion residue | Yield point stress (kPa) |
|---|---|---|---|
| 6 | — | 275 | Expanded combution residue | 4.0 |
| 7 | — | 310 | Expanded combution residue | 4.0 |

A self-extinguishing tendency was confirmed in Examples 5, 8, 9, 12, 14–19, 24, 25, 30, 31 and 33.

As is evident from Tables 1 and 2, the evaluation samples derived from the polyolefin resin compositions of Examples 1 to 36 of the present invention, upon combustion, all formed sintered bodies owing to the layered silicate contained therein, and each combustion residue retained its shape and form and, when compressed at a rate of 0.1 cm/s, showed a yield point, the yield point stress being not less than $4.9 \times 10^3$ Pa. Thus, the test specimens did not undergo shape disintegration even after combustion, hence were excellent in self-extinguishing tendency and in flame retardancy, allowing no spreading of fire. All specimens showed an elongation at break of not less than 750% and were excellent also in flexibility.

On the contrary, as evident from Table 2, the evaluation samples derived from the polyolefin resin compositions of Comparative Examples 1 to 3, 6 and 7 which contained no layered silicate, were poor in self-extinguishing tendency and inferior in flame retardancy since they failed to form combustion residues or the combustion residues failed to retain their shape and form. The evaluation samples made of the polyolefin resin composition of Comparative Example 4 in which the layered silicate had a mean interlayer distance being shorter than 3 nm were poor in self-extinguishing tendency and inferior in flame retardancy.

In Comparative Example 5, the interlayer distance was 3.5 nm but the layered silicate supposedly did not occur in a state dispersed in at most 5-layerd forms, so that the flame retardancy was not so greatly influenced. The combustion coat formation was observed only locally, and the strength could not be retained.

INDUSTRIAL APPLICABILITY

The present invention, which has the above-mentioned constitution, allows the formation of sintered bodies, which is due to the presence of the layered silicate, upon combustion as well as the retention of the shape and form of combustion residues. Accordingly, polyolefin resin compositions can be provided which will not undergo shape disintegration even after combustion and which are excellent in shape retention and self-extinguishing tendency, allow no spreading of fire, have good flame retardancy, are further excellent in mechanical strength and can retain transparency. According to the present invention, it is also possible to remarkably improve such physical properties as elastic modulus and gas barrier properties of polyolefin resins and, further, to markedly improve other physical properties, for example, heat resistance as a result of the elevation of thermal deformation temperature due to constriction of molecular chains and dimensional stability owing to the nucleating effect of inorganic crystals.

What is claimed is:

1. A polyolefin resin composition consisting essentially of 100 parts by weight of a polyolefin resin and 0.1 to 100 parts by weight of a layered silicate and 20 to 60 parts by weight of a metal hydroxide, wherein a combustion residue thereof obtained by combusting said polyolefin resin composition by heating for 30 minutes under heating condition of 50 kW/m$^2$ shows a yield point stress of not less than $4.9 \times 10^3$ Pa when compressed at a rate of 0.1 cm/s.

2. The polyolefin resin composition according to claim 1, which shows a maximum heat release rate of not more than 800 kW/m$^2$, upon combustion by heating for 30 minutes under heating condition of 50 kW/m$^2$.

3. The polyolefin resin composition according to claim 1, wherein the polyolefin resin is at least one resin selected from the group consisting of ethylene homopolymers, propylene homopolymers, copolymers of ethylene or propylene and an α-olefin copolymerizable therewith, copolymers of ethylene and (meth)acrylate and copolymers of ethylene and vinyl acetate.

4. The polyolefin resin composition according to claim 1, wherein the layered silicate is montmorillonite and/or a swellable mica.

5. (previously presented): The polyolefin resin composition according to claim 1,
   wherein the layered silicate comprises metal ions as exchangeable cations in the crystal structure thereof.

6. The polyolefin resin composition according to claim 5, wherein some or the whole of the metal ions have been exchanged for a cationic surfactant.

7. (original): The polyolefin resin composition according to claim 6,
   wherein the cationic surfactant is a homopolymer of a (meth)acrylic monomer having a quaternary ammonium salt structure, or a copolymer of a (meth)acrylic monomer having a quaternary ammonium salt structure and another (meth)acrylic monomer and/or a styrenic monomer.

8. The polyolefin resin composition according to claim 6, wherein the cationic surfactant is a quaternary alkylphosphonium salt having an alkyl group containing not less than 6 carbon atoms.

9. The polyolefin resin composition according to claim 1, wherein the layered silicate has a mean interlayer distance of not less than 3 nm as determined for the (001) face thereof by wide-angle X ray diffractometry and comprises pieces dispersing in an at most 5-layered condition in the polyolefin resin composition.

10. The polyolefin resin composition according to claim 1,
    wherein the layered silicate has the mean interlayer distance of not less than 6 nm as determined for the (001) face thereof by wide-angle X ray diffractometry.

11. The polyolefin resin composition according to claim 1, which comprises 0.5 to 100 parts by weight of at least one compound selected from the group consisting of phosphorus compounds, and melamine derivatives.

12. The polyolefin resin composition according to claim 11,
    wherein the phosphorus compound is at least one phosphorus compound selected from the group consisting of red phosphorus, ammonium polyphosphate and phosphorus compounds represented by the following general formula (1):

$$R^3(R^2)(OR^1)P=O \quad (1)$$

in the formula, $R^1$ and $R^3$ each represents a hydrogen atom, an alkyl group containing 1 to 16 carbon atoms or an aryl group and $R^2$ represents a hydrogen atom, a hydroxyl group, an alkyl or alkoxy group containing 1 to 16 carbon atoms, or an aryl or aryloxy group and, $R^1$, $R^2$ and $R^3$ may be the same or different from one another.

13. The polyolefin resin composition according to claim 1, which comprises 0.5 to 20 parts by weight of a silicate compound other than the layered silicate.

14. The polyolefin resin composition according to claim 1, which comprises 0.1 to 10 parts by weight of a metal oxide.

15. The polyolefin resin composition according to claim 1, which contains an AB type block copolymer comprising a segment (A) having a functional group showing reactivity with the layered silicate and a segment (B) having affinity for the polyolefin resin.

16. The polyolefin resin composition according to claim 1, which comprises 0.01 to 30 parts by weight of an aromatic hydroxyl-containing compound.

17. A thermoplastic resin intended for use in cable jacketing or sheathing
which comprises the polyolefin resin composition according to claim 1.

18. An insulated cable which comprises the thermoplastic resin according to claim 17.

19. The polyolefin resin composition according to claim 2,
wherein the polyolefin resin is at least one resin selected from the group consisting of ethylene homopolymers, propylene homopolymers, copolymers of ethylene or propylene and an α-olefin copolymerizable therewith, copolymers of ethylene and (meth)acrylate and copolymers of ethylene and vinyl acetate.

* * * * *